United States Patent [19]

Tang

[11] Patent Number: 5,553,126
[45] Date of Patent: Sep. 3, 1996

[54] SECURE ANTI-JAMMING WIRELESS PARTY LINE

[75] Inventor: Douglas D. Tang, Chelmsford, Mass.

[73] Assignee: GTE Laboratories Incorporated, Waltham, Mass.

[21] Appl. No.: 375,876

[22] Filed: Jan. 20, 1995

[51] Int. Cl.$^6$ .................. H04M 13/00; H04M 11/00; H04J 13/00
[52] U.S. Cl. .................. 379/185; 379/58; 379/59; 370/18
[58] Field of Search .................. 379/181, 179, 379/185, 58, 59, 60, 61, 62, 63; 375/200; 370/18, 85.8, 85.7, 95.1, 95.2; 455/33, 33.1, 33.4, 53.1, 54.2

[56] References Cited

U.S. PATENT DOCUMENTS

| 4,392,220 | 7/1983 | Hirosaki et al. | 370/18 |
|---|---|---|---|
| 4,777,652 | 10/1988 | Stolarczyk | 455/55 X |
| 5,022,068 | 6/1991 | Fujisaki et al. | 379/185 X |
| 5,255,306 | 10/1993 | Melton et al. | 379/58 X |
| 5,257,257 | 10/1993 | Chen et al. | 370/18 |
| 5,353,303 | 10/1994 | Walthall | 375/200 |
| 5,422,952 | 6/1995 | Kennedy et al. | 370/18 X |
| 5,440,544 | 8/1995 | Zinser, Jr. | 370/50 |
| 5,454,032 | 9/1995 | Pinard et al. | 379/185 X |
| 5,455,822 | 10/1995 | Dixon et al. | 370/18 |
| 5,459,469 | 10/1995 | Schuchman et al. | 342/37 |

Primary Examiner—Stephen Chin
Assistant Examiner—Paul Loomis
Attorney, Agent, or Firm—James J. Cannon, Jr.

[57] ABSTRACT

A secure wireless party line system that can be used by a group of mobile users to communicate with each other like a wired party line but without the cumbersome inconvenience of long wired tether. The party line function is achieved by the use of a fixed wireless repeater. The fixed wireless repeater receives spread spectrum transmissions from all N mobile users at a frequency f1, and passes the received signals through an RF amplifier and upconverter, and then to an IF amplifier and power divider, which converts the received signals down to a convenient intermediate frequency (IF), and feeds N receive spread spectrum processors, each dedicated to receive a coded spread spectrum transmission from one user. The received voice outputs from the N users are then combined in a N-channel voice data multiplexer, and broadcast at a frequency f2 to all users with a common spread spectrum code word added by a transmit spread spectrum processor. The commonly coded broadcast messages are processed by an RF amplifier and broadcast at frequency f2. All mobile radio receivers receive on the same common code word used by the fixed wireless repeater for broadcasting. Each mobile user on said party line carries a simple single channel radio transceiver. Spread spectrum transmission provides security and anti-jamming performance. Analog and digital embodiments are disclosed.

12 Claims, 10 Drawing Sheets

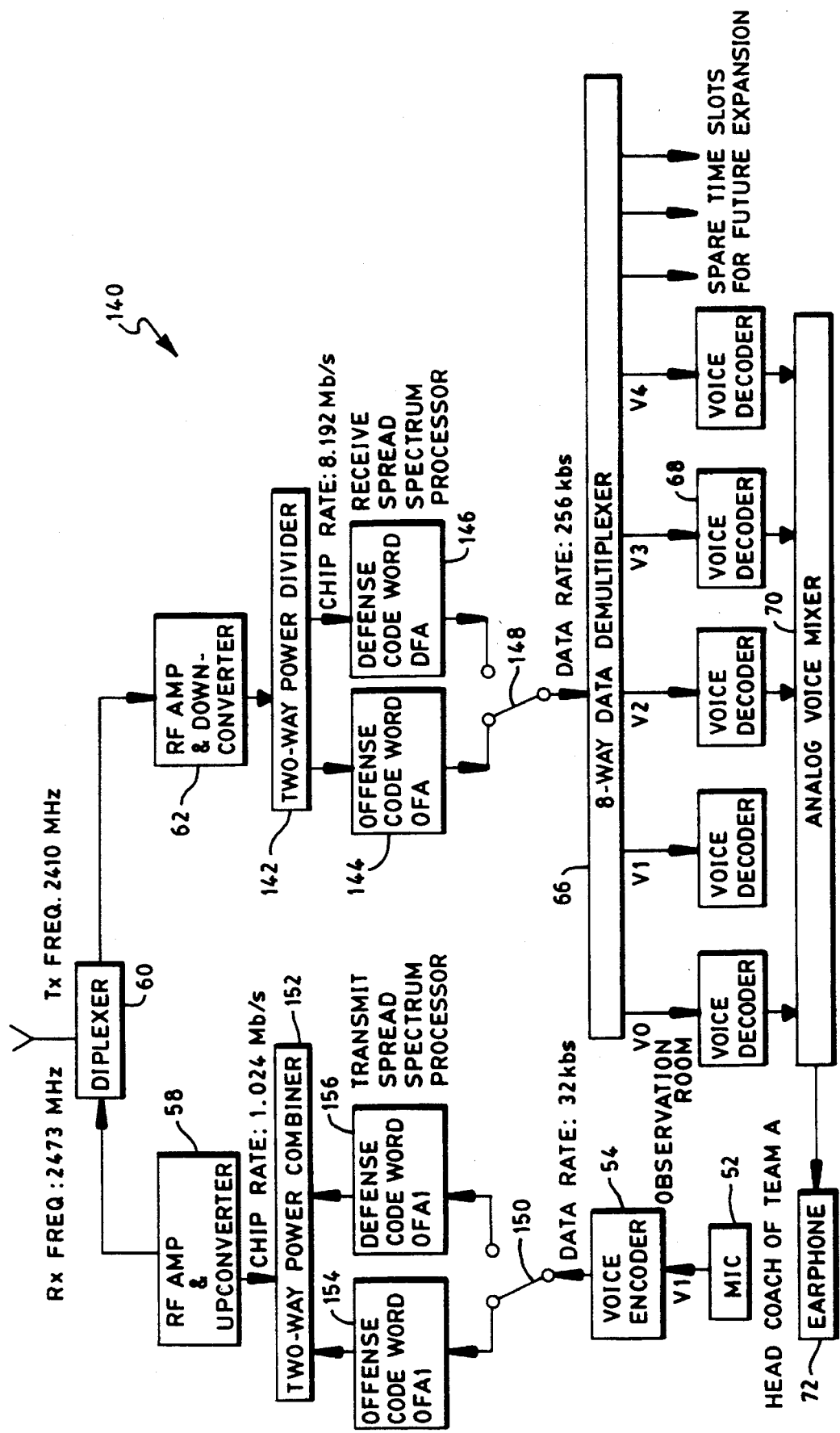

SECURE ANTI-JAMMING WIRELESS PARTY LINE

BACKGROUND OF THE INVENTION

1. Field of the Invention

This invention pertains to the field of radio telecommunications generally, and more specifically, to the field of radio telecommunications, cellular and/or wireless personal communications. In particular, it pertains to the provision of a secure wireless party line for radio telecommunications, which is especially useful for mobile cellular and/or personal telecommunications.

2. Description of the Prior Art

This invention pertains to a secure wireless party line system which can be used by a group of wireless mobile radio-telephone users to communicate with each other as though they were connected by a wired party line, but without the cumbersome inconvenience of a long wired tether. The party line function is achieved by the used of a fixed wireless repeater. Each mobile user carries a simple single channel radio transceiver. Spread spectrum transmission is used to provide security and anti-jamming performance.

The party line of conventional wired telephone systems is well known in the prior art, and need not be described in detail. The drawbacks and limitations of the conventional wired party line are also well known. In particular, these drawbacks are dramatically apparent in public events, such as professional sporting events.

Without limiting the generality of the invention of this disclosure, the invention will be described and illustrated with an example from professional sporting events. The outcome of any one of the National Football League (NFL) games carries a tremendously high monetary stake. The way each game is played relies heavily on the instructions from the coaches during the game. Using the wired system 10 illustrated in FIG. 1, the coaches 12, 14, 15 make their decisions on strategy based on the communications received from observers 16, 18 located in a booth 20 high above the playing field 22. These observers 16, 18 have a bird's eye view of all the players on the field 72. There are usually five observers for each team, two on defense 18 and three on offense 16. The communication between the observers 16, 18 high in the booth 20 and the coaches 12, 14, 15 on the playing field 22 is by a dedicated wired party line system 10, as shown in FIG. 1. In this system, the coaches 14 and the observers 16, associated with the offense are connected to one party line 24; and those persons 15, 18 associated with defense are connected to a second party line 26. The head coach 12 can select either one of these two party lines by a switch 28. An identical system is used by the opposing team. The two systems are entirely separate and independent of each other. In a wired party line system, when one person talks, his voice is broadcast to every other person connected to the party line. When several persons are talking at the same time, the individual talker is identified through voice recognition. The coaches 12, 14, 15 on the field communicate with the players, but are confined to move around within a rectangle 40×10 yards, as specified by NFL rules. To accommodate his movements, every coach on the field carries a spool of wire with a dedicated assistant to wind and unwind the spool of wire as required by his movement. The major drawback of this system is the wire that each coach must carry and the necessity of winding and unwinding the wire to accommodate the movement of the coach. If there are ten talkers in a given area, there is usually a tangled mess of wires on the ground. This tangled mess of wires not only impedes the movements of the coaches, but also presents a major hazard to the safety of the coaches.

It is highly desirable to replace the two wired party line systems 10 with two secure wireless systems, one for each team. This will eliminate the wires between the field coaches and the wired voice outlets, thus eliminating the tangled mess of wires on the ground. The coaches, who no longer have to worry about being tripped by the wires on the ground, will be able to move freely and expediently in carrying out their instructions to the players.

However, all wireless systems are dedicated systems with one channel for each user. The channels are either separated by frequency as in a frequency division system, or by time as in a time division system, or by code as in a code division system. In order for each user to hear all the other users, he must carry as many radios as there are other users. For instance, if the wireless system is to replace a ten-person party line system, each mobile user must carry nine radios in order to hear and talk to the other nine users at the same time. This is not practical for a portable unit powered by battery.

It is the principal object of this invention to provide a wireless radio-telephone system for party line operation which can operate with only a single radio-telephone for each mobile user.

It is a further object of this invention to provide such a wireless radio-telephone system which is secure and anti-jamming.

It is still a further object of this invention to provide such a secure, wireless radio-telephone party line system which can be used for many communications applications which utilize a patch between wired and wireless telephone users for business purposes or during situations of crisis involving law enforcement, medical, or emergency personnel when several people in different locations must have constant and secure communication with each other.

BRIEF DESCRIPTION OF THE DRAWINGS

FIG. 8 is a block diagram of a wireless radio for a head coach who is a mobile talker using the secure wireless party line for the embodiment of FIG. 6.

DESCRIPTION OF THE PREFERRED EMBODIMENT

The system of the present invention replaces a dedicated wired party line with a secure wireless party line for radio telecommunications requiring only one radio for each user. This wireless system provides positive protection against eavesdropping and jamming. The security of the wireless party line system is achieved by the use of spread spectrum technology, and the scrambling of digitally coded voice data. A spread spectrum communication link communicates by code word. To receive a spread spectrum signal the receiver must have the correct code word. The code word is selected randomly by a computer and loaded into each mobile radio unit prior to the use of the system. No one, including the computer, will have any knowledge of the code words used in each radio. New code words are loaded into each unit prior to the use of the system. The code words can be changed as often as necessary during each event or crisis to guard against any code-breaking attempts. The anti-jamming performance is achieved by spreading the jamming signal with the code word. This system is similar to a code division multiple access (CDMA) system. The chip rate and the length of the code word are selected to accommodate any required number of mobile users. The principles of a spread spectrum system are well documented in the literature and will not be discussed here.

Figure 2:
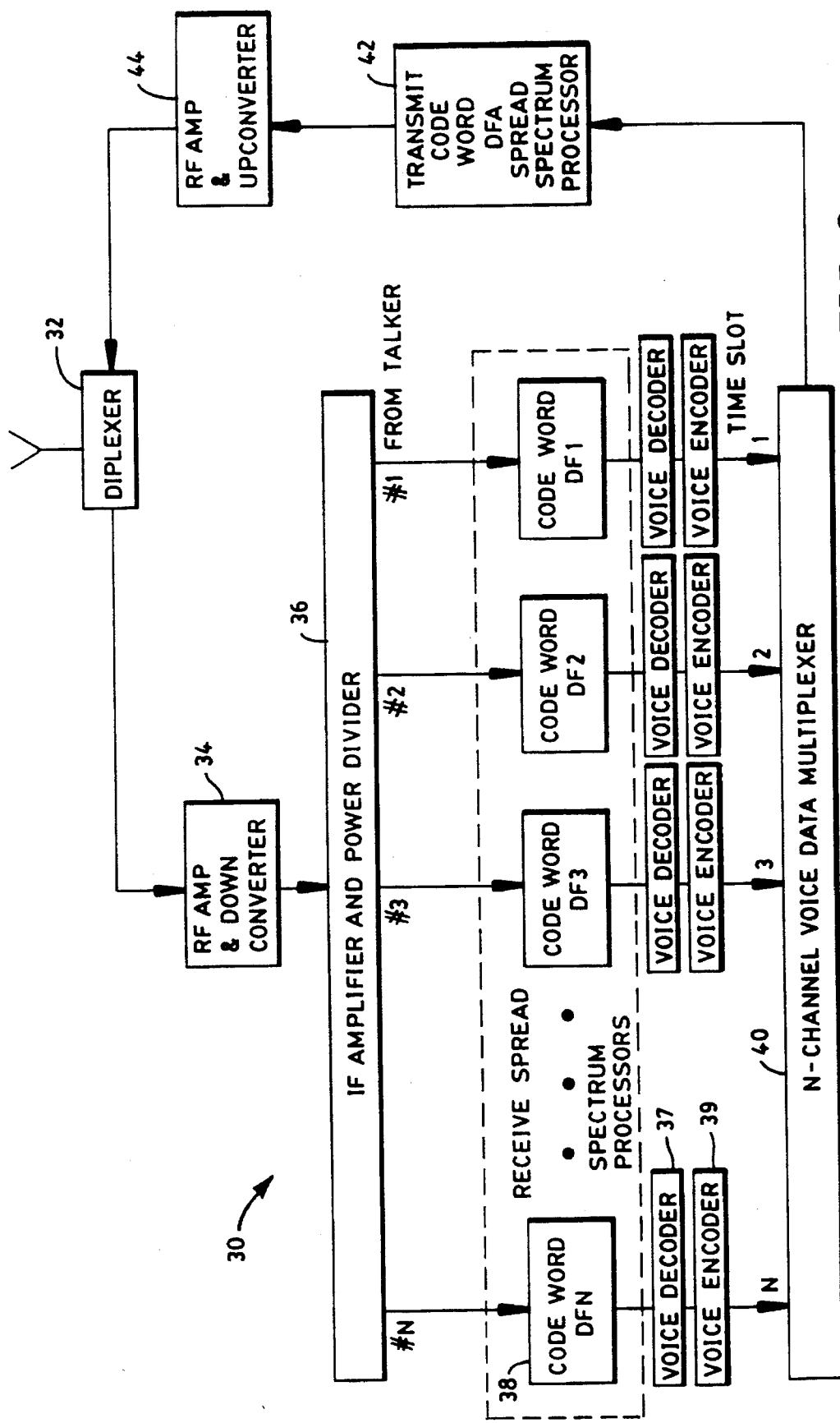
FIG. 2 is a block diagram of a fixed repeater, for providing a secure party line for a plurality of mobile talkers with voice data multiplexing, according to the present invention.
Figure 3:
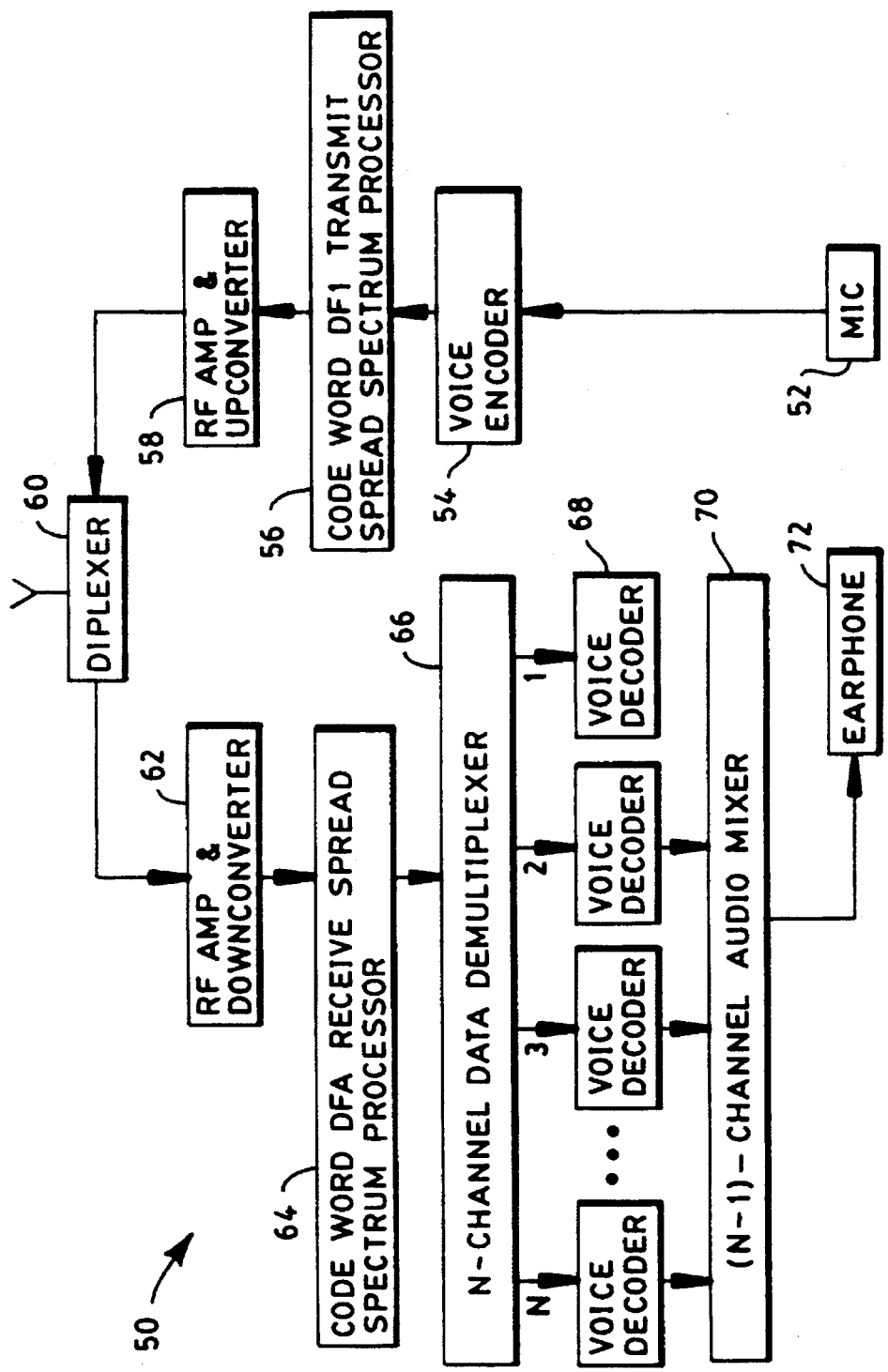
FIG. 3 is a block diagram of a wireless radio for a mobile talker with voice data multiplexing, for the secure wireless party line of the present invention.

Referring now to the drawings, FIGS. 2 and 3 show the secure wireless radio telecommunications party line system using digital voice data multiplexing. FIG. 2 shows the principal features of a configuration of a fixed wireless repeater 30, and FIG. 3 shows the portable unit 50 carried by the mobile users. The party line operation of the wireless system of this invention is accomplished by the use of this fixed wireless repeater 30, with all N mobile users under its radio coverage. Each mobile user has a unique code word for transmitting. Since the wireless repeater 30 is fixed and ac powered, it can be much more complex than the portable radios. The fixed wireless repeater 30 receives the spread spectrum transmissions from all N users at a frequency f1, and passes the received signals through a diplexer 32, an RF amplifier and downconverter 34, and then to an IF amplifier and power divider 36, which converts the received signals down to a convenient intermediate frequency (IF), and feeds N receive spread spectrum processors 38, each dedicated to receive a coded spread spectrum transmission from one user. Each receive spread spectrum processor 38 has an output consisting of a digitized voice data stream, but the times of arrival of the streams may not be synchronized, due to movement of the mobile users. To resolve any timing problems each voice data stream is decoded by a voice decoder 37 to analog voice and then encoded again by a voice encoder 39. The received voice data outputs from the N users are then combined in a N-channel voice data multiplexer 40, and for broadcast to all users with a common spread spectrum code word DFA provided by a transmit spread spectrum processor 42. The commonly coded messages are processed by an RF amplifier 44 and sent through diplexer 32 to be broadcast at frequency f2. All mobile radio receivers (FIG. 3) receive on the same common code word used by the fixed wireless repeater 30 for broadcasting. Therefore, each mobile user needs only one radio transceiver. Thus, the system of the present invention utilizes a fixed repeater 30 as the interface for a cellular or other type radio-telephonic system to provide a secure wireless party line requiring only one radio for each mobile user.

Figure 1:
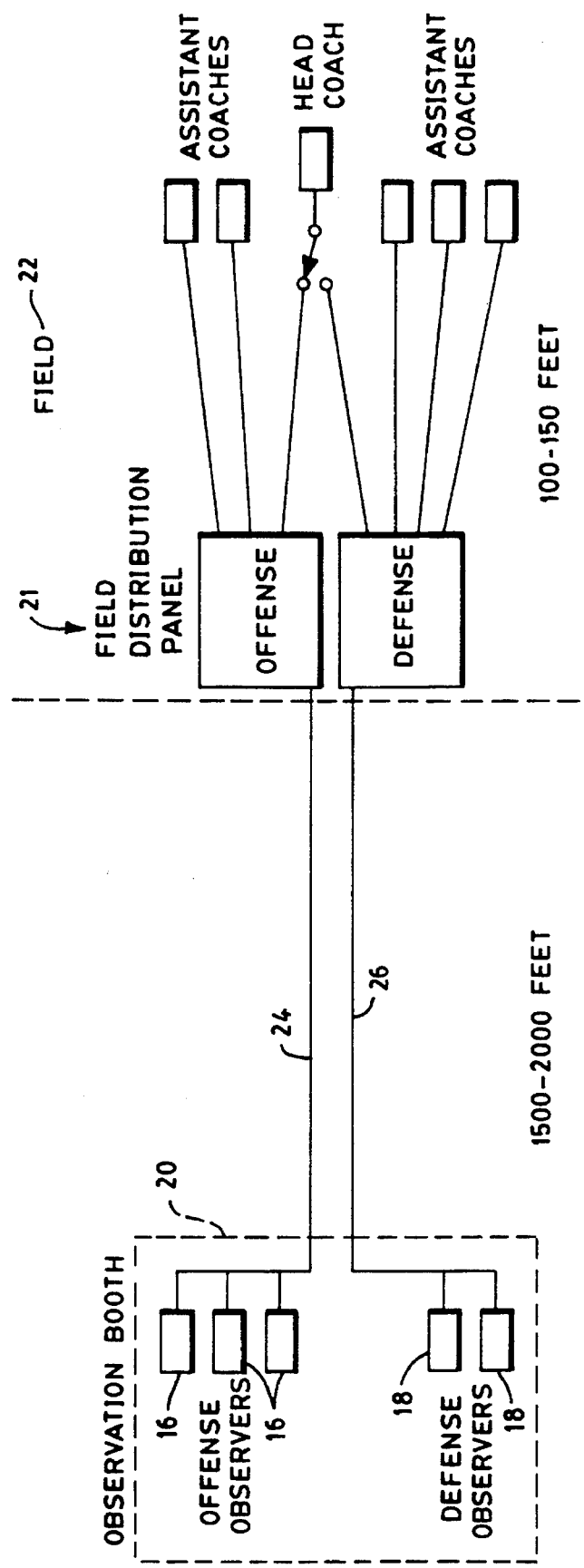
FIG. 1 is a block diagram of a prior art typical wired party line as used for communication among coaches in professional football games.

For the NFL application illustrated in FIG. 1, there are M fixed observers 16, 18 in the observation booth 20, whose voices are combined and hardwired to a distribution panel 21 on the field 22 by a party line. On the field there are N mobile coaches 12, 14, 15. In this application, the fixed wireless repeater will have N spread spectrum processors 38 for the mobile coaches and one hardwired voice input from the observers 16, 18 in the booth 20, as will be shown later in FIGS. 6 and 7. The fixed wireless repeaters 30 are located on the playing field at the center of the long side of the rectangle (not shown) near the spectators, one on each side of the playing field 22.

Two different methods can be used to combine the N voices from the mobile radio-telephones: analog audio mixers or digital voice data multiplexing. Both methods will use the same radio frequency (RF), same intermediate frequency (IF) circuits, and the same spread spectrum processors. The difference lies in the way the base band voices are combined and distributed.

FIG. 3 is a block diagram of the portable unit 50 carried by each of the N mobile users. The voice of each mobile user picked up by microphone 52 is first digitized and encoded by a voice encoder 54, and then spread with a preprogrammed code word, DF1 for user #1, DF2 for user #2, DF3 for user #3, and DFn for the user #N, as shown in block 56 of FIG. 3. The spread spectrum signal is then up-converted in block 58 to the final rf frequency, f1, for transmission through diplexer 60. All mobile users transmit at the same radio frequency f1, but with different code words. The fixed wireless repeater 30, shown in FIG. 2, receives (block 32) all N transmissions from the mobile users, converts them down to a convenient intermediate frequency (blocks 34, 36), and then distributes them to N spread spectrum processors 38, each with a code word matching a respective mobile user. The N output data streams from the N spread spectrum processors 38 are the voice data streams of the N mobile users, but the times of arrival of the streams may not be synchronized, due to movement of the mobile users. To resolve any timing problems each voice data stream is decoded by a voice decoder 37 to analog voice and then encoded again by a voice encoder 39. These N voice data streams are then time-multiplexed by an N-channel data multiplexer 40 to N different time slots to form one combined data stream, which is then spread by the transmit spread spectrum processor 42 with the code word DFA, up-converted (block 44) to radio frequency, f2, for broadcast to all mobile receivers 50. Referring to FIG. 3, we see that all mobile receivers 50 are preprogrammed with the common code word DFA (block 64). Therefore, all mobile receivers 50 receive the rf spread spectrum signal containing the combined voice data stream broadcast by the fixed wireless repeater 30. After down-conversion (block 62), the combined voice data stream is recovered by the code word DFA spread spectrum processor 64. The combined voice data stream is then passed through an N-channel demultiplexer 66 to separate the N individual voice data streams, as shown in FIG. 3. Each voice data stream 67 is then decoded by a voice decoder 68 to obtain the analog voice. To avoid the talker hearing himself talking, his own voice is excluded, and the rest of the (N-1) analog voices are combined in a (N-1) channel audio mixer 70. The output of the mixer 70 is used to drive his earphone 72. The party line performance is achieved with only one radio transceiver 50 for each mobile user. If $R_v$ is the voice data rate from the voice encoder 54, transmitted by the mobile talker, then the data rate transmitted by the repeater 30 is $NR_v$. A total of (N+1) code words are used.

Figure 4:
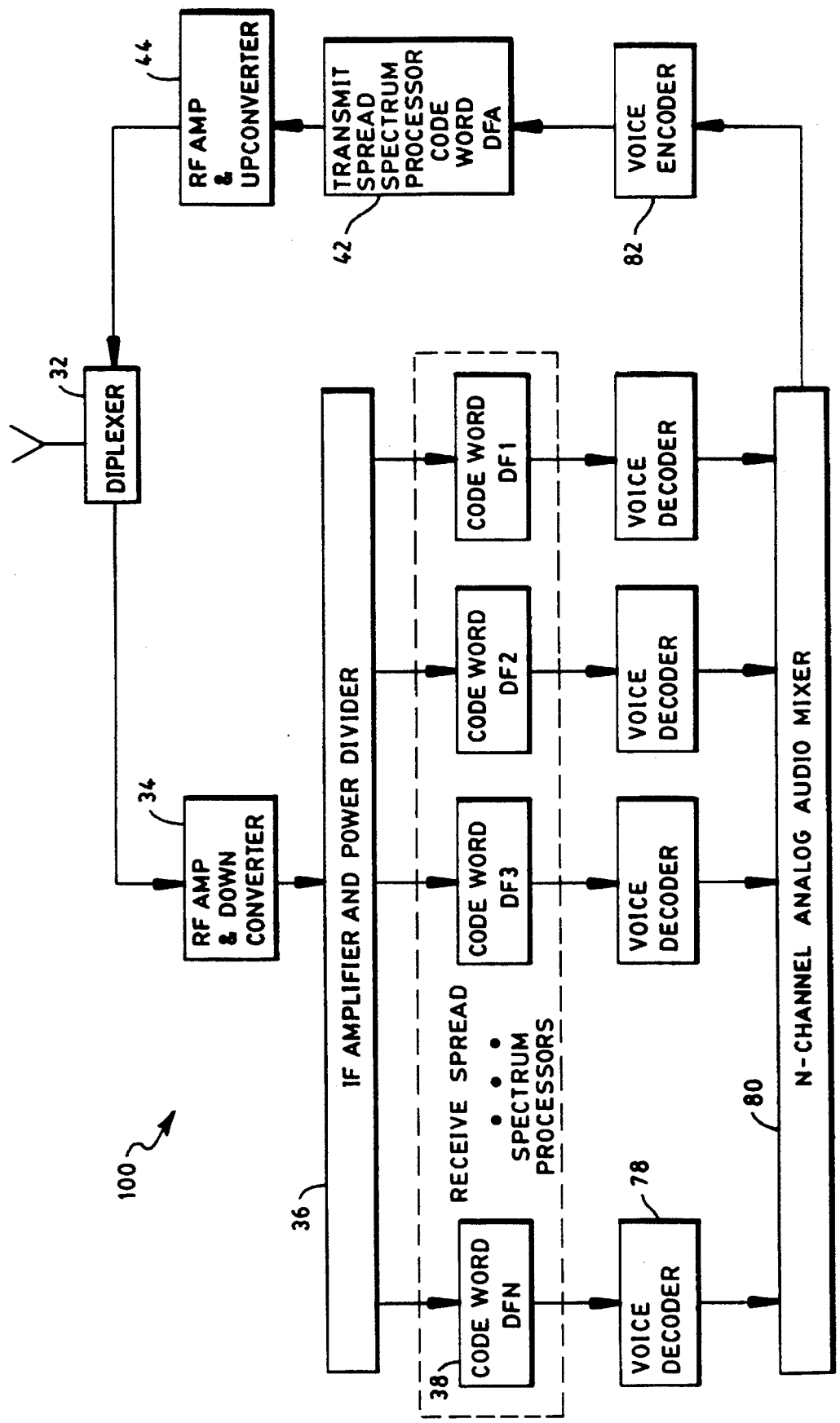
FIG. 4 is a block diagram of a fixed repeater, for providing a secure party line for a plurality of mobile talkers with analog audio mixing, according to the present invention.

The wireless party line system using an analog audio mixer is similar to that using digital data multiplexer 40, except for the difference in the way the voices are combined in the repeater 100, as shown in FIG. 4. The received digital voice data stream from each user is decoded in voice decoder 78 to obtain the analog voice. The N analog voices are then mixed in a N-channel audio mixer 80. The mixed audio output is then encoded by a voice encoder 82, spread with code word DFA (block 42), and up-converted to radio frequency f2 (block 44) for broadcast to all mobile users (block 32).

Figure 5:
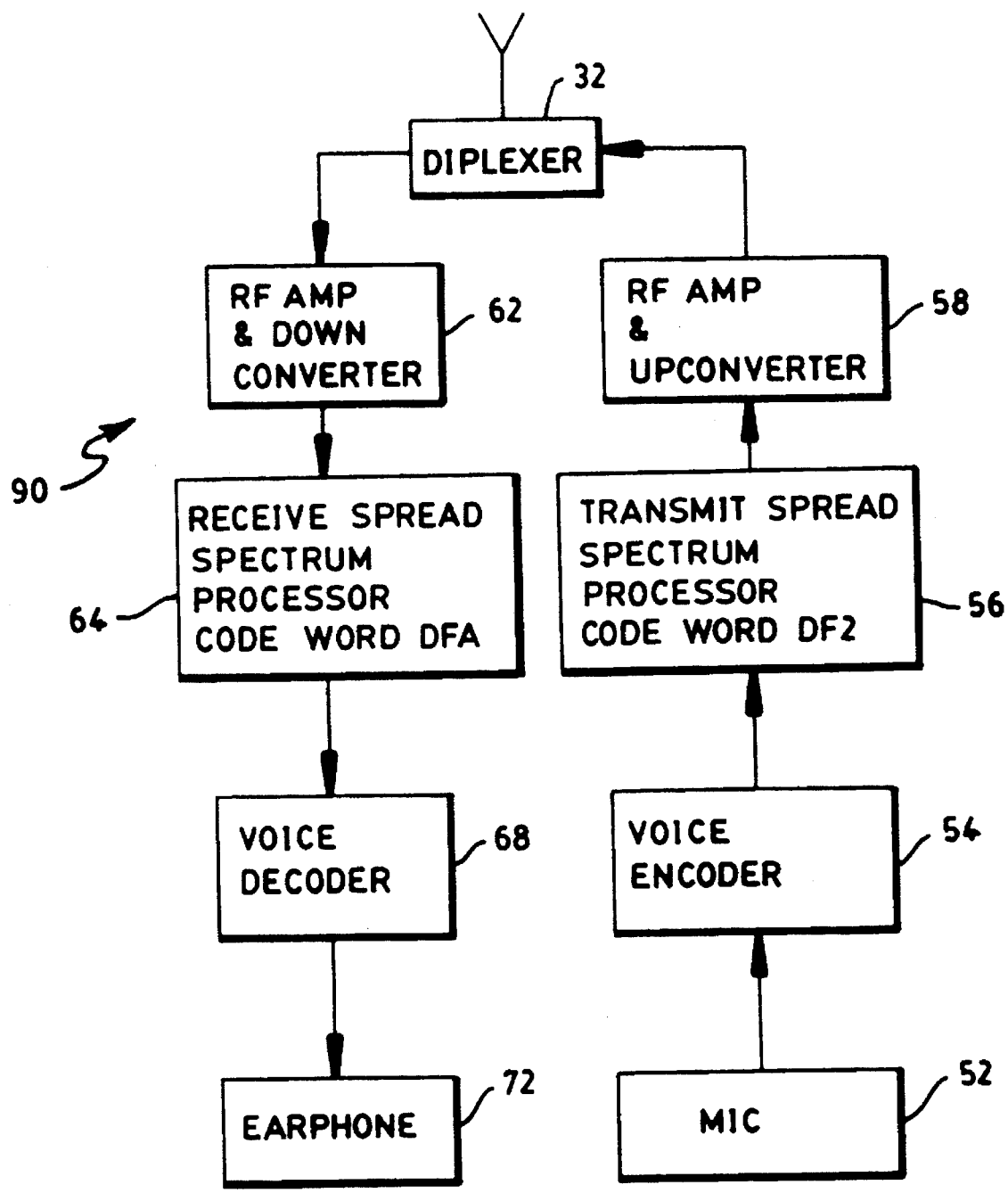
FIG. 5 is a block diagram of a wireless radio for a mobile talker with an audio mixer at the repeater, for the secure wireless party line of the present invention.

Referring to FIG. 5, in the analog system the mobile receivers 90 receive the signal (block 32), recover the data stream of the mixed voices (blocks 62–64), obtain the mixed voice with a decoder (block 68), send the mixed voices to the earphone 72, as shown in FIG. 5. The one drawback is that each user will hear himself talking with a slight delay due to processing time and propagation delay. However, since the mobile unit does not require an N-channel data demultiplexer and (N–1) channel audio mixer (blocks 66 and 70 of FIG. 3), the mobile radio transceiver 90 is considerably simpler than that used in the digital system and consumes less battery power, provided that hearing the echo of one's own voice is acceptable by the users. The data rate used by the fixed repeater 100 can be as low as $R_v$. A higher data rate may be used to improve voice quality for recognition. The same number of code words is used as the previously discussed digital system.

Returning now to an application of the preferred embodiment, as shown in FIG. 1, during each NFL game, each team has typically five or six observers 16, 18 in a small room 20 located in the highest floor of the stadium to have a bird's eye view of the entire playing field. These two rooms 20 are well isolated from each other. Dedicated hardwired party line voice circuits 24, 26 connects the observers 16, 18 in one room 20 to a distribution panel 21 located on one side of the field, and another identical dedicated hardwired voice circuit (not shown) connects the other room to a second distribution panel located on the opposite side of the field. One fixed wireless repeater 30 is located near each distribution panel 21, with an antenna designed to have an azimuth radiating pattern covering only the 40 yards×10 yards rectangle. No radiation will be spilled to the opposite side of the field where the fixed wireless repeater of the opposing team is located.

Figure 6A:
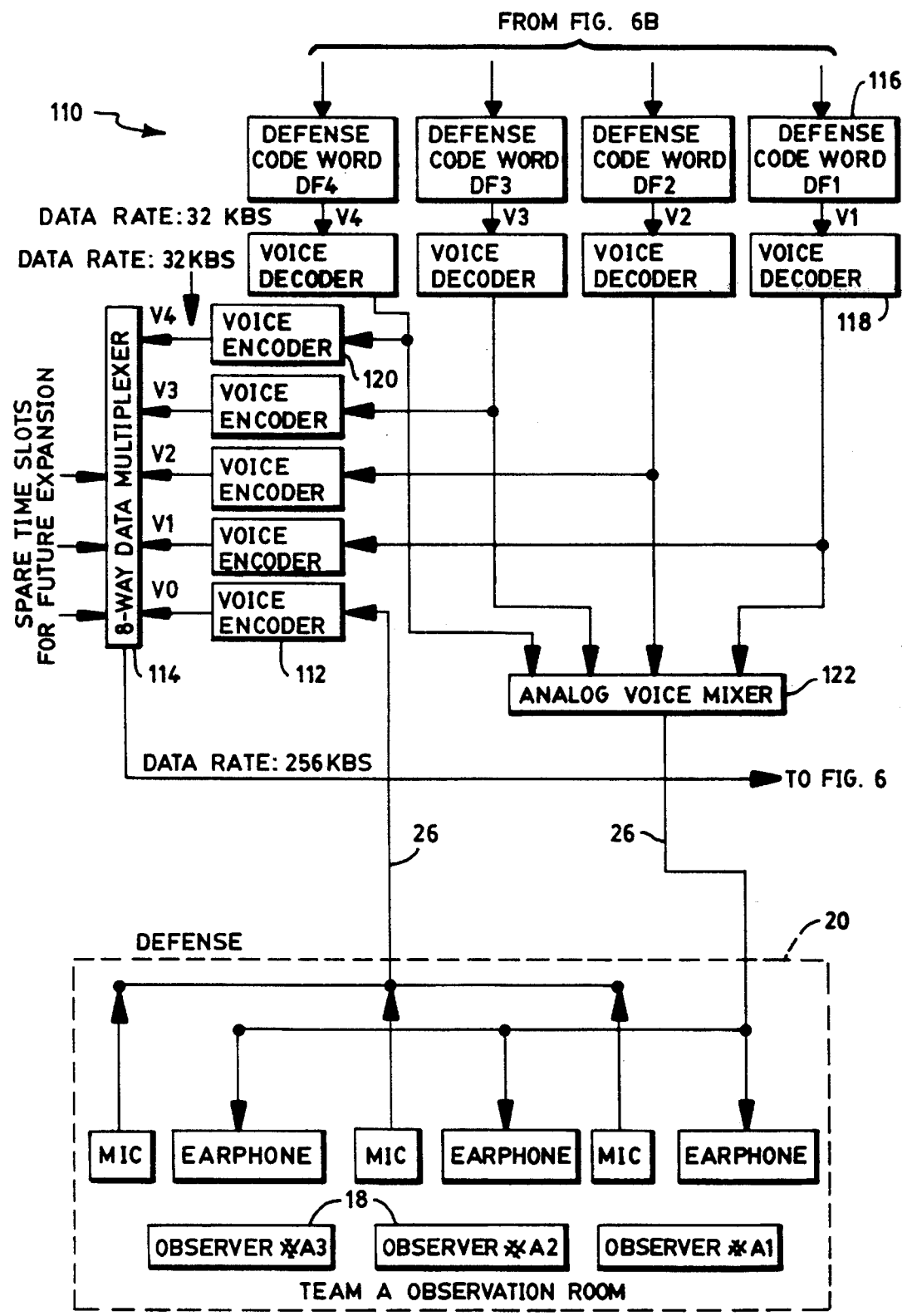
FIG. 6a, 6b and 6c is a block diagram of a fixed field repeater, for providing a secure party line for a plurality of mobile talkers with voice data multiplexing, according to one embodiment of the present invention.
Figure 6B:
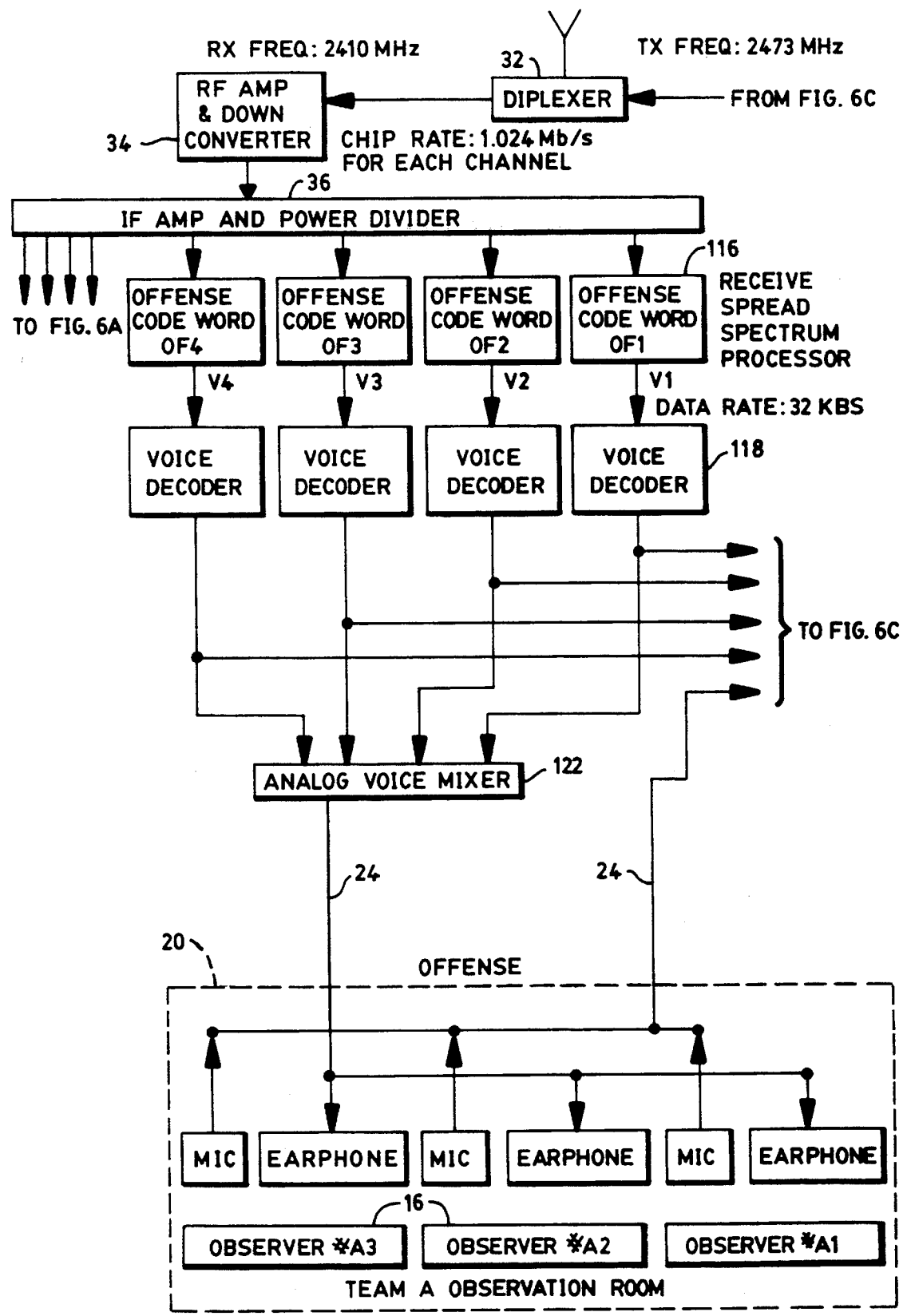
Figure 6C:
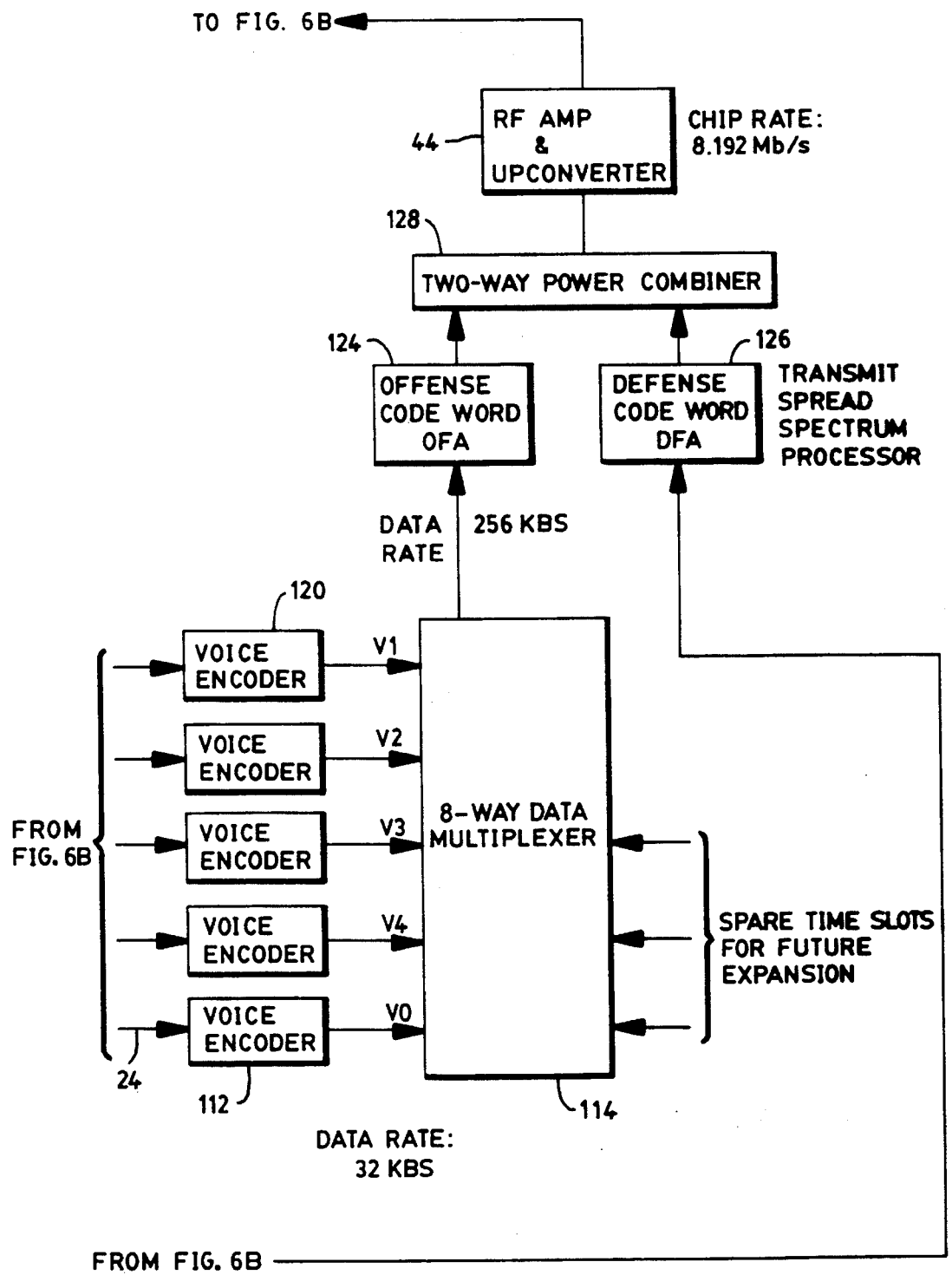
Figure 7:
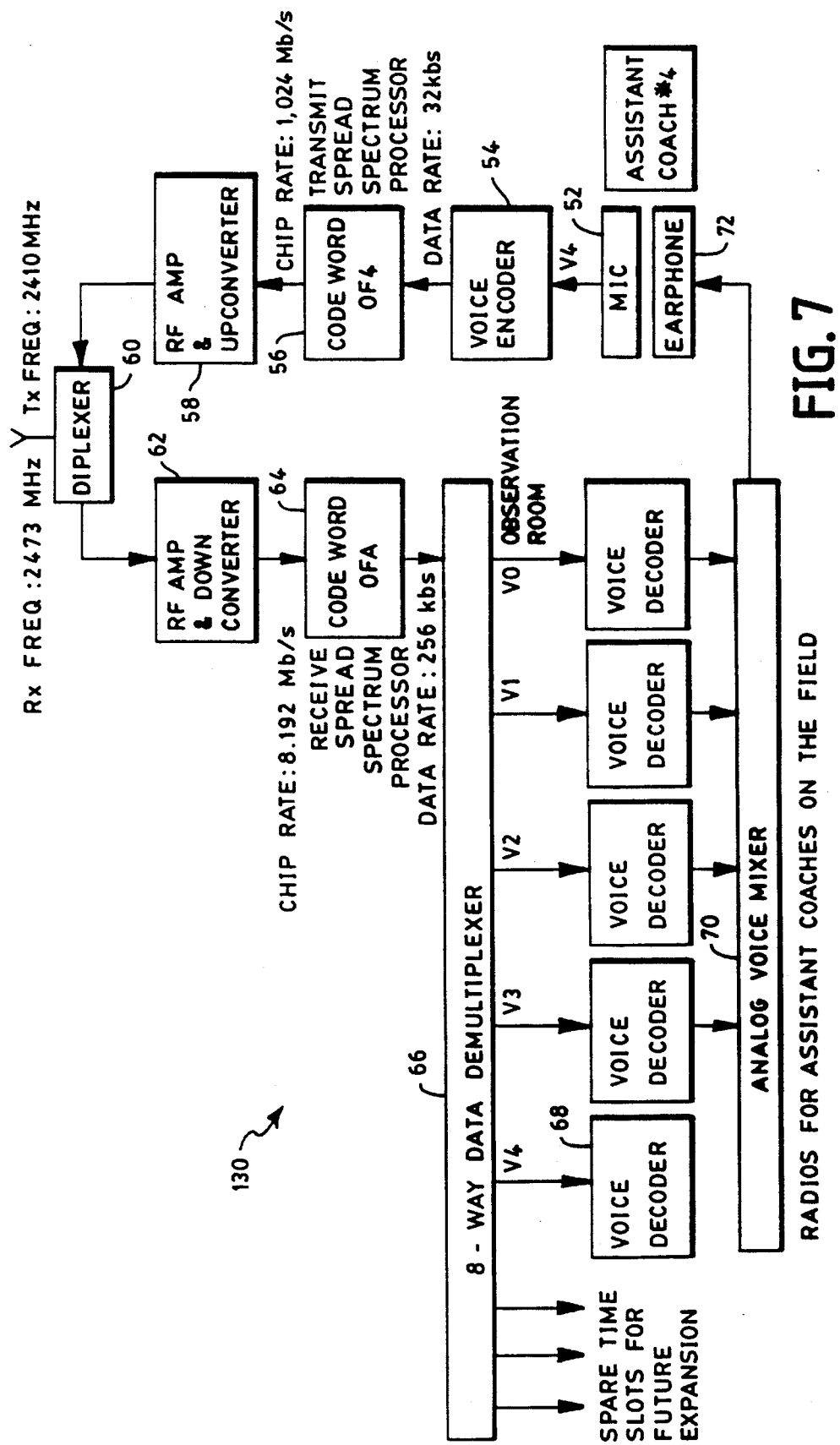
FIG. 7 is a block diagram of a wireless radio for an assistant coach who is a mobile talker using the secure wireless party line for the embodiment of FIG. 6.

FIG. 6 is a block diagram of a complete of the fixed wireless repeater 110 for the NFL game application, for providing secure party lines for a plurality of mobile talkers with voice data multiplexing, as used for communication among coaches of teams in professional football games, according to one embodiment of the present invention. FIG. 7 shows a block diagram of the mobile radio 50 used by the offensive and defensive coaches, the assistant coaches 14, 15, on the field. FIG. 8 shows a block diagram of the mobile radio 50 used by the head coaches 12 on the field. In the embodiment of FIGS. 6, 7 and 8, two party lines are provided, one for the offensive coaches and one for the defensive coaches. The head coach is able to switch between the two party lines. Since the observation room 20 is small and in order to use the existing wired party line 24, 26 for connection between the observation room 20 and the distribution panel 21 on the field, the observers 16, 18 in the observation room are treated as one user. Their combined voices V0 are encoded (block 112) and multiplexed (block 114) with the voice data streams (blocks 116, 118, 120) from the coaches on the field 12, 14, 15 as shown in FIG. 6. The combined voices of the coaches on the field are sent to the observation room 20 for the observers 16, 18 through the analog voice mixers 122. The combined voices of the coaches on the field and the observers are sent to each coach on the field via data multiplexers 114, transmit spread spectrum processors 124, 126 which provide common code words for offensive and defensive coaches respectively, a two-way power combiner 128, RF amplifier and upconverter 44, and diplexer 32.

The radio transceiver 130, shown in FIG. 7, carried on the field by assistant coaches, uses a digital voice data demultiplexer so that each coach may exclude his own voice. Of course, analog voice mixing can also be used, as shown in FIG. 5.

The radio transceiver 140, shown in FIG. 7, carried on the field by the head coach also uses a digital voice data demultiplexer so that the head coach may exclude his own voice. Of course, analog voice mixing can also be used, as shown in FIG. 5. Transceiver 140 differs from transceiver 130 because it allows for switching between the two party lines via switches 148, 150. Transceiver 140 also includes two transmit spread spectrum processors 154, 156, and a two way power combiner 152, and two receive spread spectrum processors 144, 146, and a two way power divider 142. Though code word switching may be used to reduce the number of spread spectrum processors to one for transmit and one for receive, due to the finite synchronization time required, dedicated processors are preferred.

Thus, the system of the present invention replaces a dedicated wired party line with a secure wireless party line for radiotelecommunications requiring only one radio for each user. The system of the present invention utilizes a fixed wireless repeater as the interface for a cellular or other type radio-telephonic system to provide a secure wireless party line. This wireless system provides positive protection against eavesdropping and jamming. The security of the wireless party line system is achieved by the use of spread spectrum technology, and the scrambling of digitally coded voice data.

What is claimed is:

1. A wireless party line for radiotelecommunications, comprising:

at least two radio-telephones, each programmed with an identifying code word for inclusion in each of its transmissions and with a common identifying code word for reception of transmissions from other sources;

a fixed wireless repeater capable of receiving telephonic communications from a plurality of radio-telephones within its radio coverage, each with its unique identifying code word, and capable of retransmitting by radio each of said telephonic communications to a plurality of mobile radio-telephones simultaneously using a common identifying code word;

whereby said fixed wireless repeater provides a party line by means of which each mobile radio-telephone receives all retransmitted communications from said wireless mobile radio-telephones.

2. The wireless party line for radiotelecommunications of claim 1 further comprising means to render said radio radio-telephonic communications secure.

3. The wireless party line for radiotelecommunications of claim 1 wherein said means to render said radio radio-telephonic communications secure comprises:

means to assign to each mobile radio-telephone a unique code word for transmitting; and means to spread the spectrum of each radio transmission.

4. The wireless party line for radiotelecommunications of claim 1 wherein said fixed wireless repeater comprises:

means to receive radio signals from a plurality of radio-telephones, at a first frequency, wherein each transmission from each said radio-telephone includes said identifying code word;

means to convert received radio signals from said plurality of radio-telephones down to a convenient intermediate frequency (IF);

means to feed said coded radio signals to N receive spread spectrum processors, each dedicated to receive a coded spread spectrum transmission from one radio-telephone, whose output is a digitized voice data stream;

means to combine said digitized voice data stream outputs from said N receive spread spectrum processors in an N-channel voice data multiplexer; and means to broadcast at a frequency f2 said combined voice outputs from said N plurality of radio-telephones to all radio-telephones with a common spread spectrum code word added by a transmit spread spectrum processor.

5. The wireless party line for radiotelecommunications of claim 4 wherein said fixed wireless repeater further comprises:

means to convert said received coded radio signals to analog voice outputs; and means to encode said analog voice outputs to recover said digitized voice data stream with time synchronization.

6. The wireless party line for radiotelecommunications of claim 4 wherein said fixed wireless repeater further comprises:

means to time-multiplex said N output data streams from said N spread spectrum processors representing the voice data streams of the N mobile users to N different time slots to form one combined data stream;

means to spread said combined date stream with a common code word, upconverted to radio frequency, f2, for broadcast to all mobile receivers.

7. The wireless party line for radiotelecommunications of claim 1 wherein each mobile radio-telephone connected to said fixed wireless repeater comprises:

voice encoding means to digitize and encode the voice of a mobile user;

means to spread said encoded voice with a preprogrammed code word; means to up-convert said spread spectrum signal to a final rf frequency, $f_1$, for transmission;

such that all mobile radio-telephones on said party line transmit at the same radio frequency f1, but with different code words.

8. The wireless party line for radiotelecommunications of claim 7 wherein each mobile radio-telephone connected to said fixed wireless repeater further comprises:

a preprogrammed a code word, common to all mobile receivers;

means to receive the rf spread spectrum signal containing said combined voice data stream broadcast by said fixed wireless repeater;

means to down-convert and recover said combined voice data stream;

means to demultiplex said combined voice data stream to separate the N individual voice data streams;

means to decode each voice data stream to obtain its analog voice;

means to exclude the voice transmitted from said radio-telephone;

means to combine the rest of the (N−1) analog voices on said party line in a (N−1) channel audio mixer; and, means to drive an earphone with the output of said audio mixer;

whereby said party line performance is achieved with only one radio transceiver for each mobile user.

9. The wireless party line for radiotelecommunications of claim 1 wherein said fixed wireless repeater comprises:

means to receive radio signals from a plurality of radio-telephones, at a first frequency, wherein each transmission from each said radio-telephone includes said identifying code word;

means to convert received radio signals from said plurality of radio-telephones down to a convenient intermediate frequency (IF);

means to feed said coded radio signals to N receive spread spectrum processors 38, each dedicated to receive a coded spread spectrum transmission from one radio-telephone;

means to convert said received coded radio signals to voice outputs from said N plurality of radio-telephones;

means to mix said N analog voices in a N-channel audio mixer 80;

means to encode said mixed audio output;

means to spread said mixed audio output with a common code word, up-converted to radio frequency $f_2$; and means to broadcast at a frequency f2 said combined voice outputs from said N plurality of radio-telephones to all radio-telephones.

10. The wireless party line for radiotelecommunications of claim 9 wherein each mobile radio-telephone connected to said fixed wireless repeater comprises:

voice encoding means to digitize and encode the voice of a mobile user;

means to spread said encoded voice with a preprogrammed code word;

means to up-convert said spread spectrum signal to a final rf frequency, $f_1$, for transmission;

such that all mobile radio-telephones on said party line transmit at the same radio frequency f1, but with different code words.

11. The wireless party line for radiotelecommunications of claim 10 wherein each mobile radio-telephone connected to said fixed wireless repeater further comprises:

a preprogrammed a code word, common to all mobile receivers;

means to receive the rf spread spectrum signal containing said combined voice data stream broadcast by said fixed wireless repeater;

means to down-convert and recover said combined voice data stream;

means to decode said voice data stream to obtain its analog voice;

means to drive an earphone with said analog voice stream;

whereby said party line performance is achieved with only one radio transceiver for each mobile user; such that each user will hear himself talking with a slight delay due to processing time and propagation delay.

12. The wireless party line for radiotelecommunications of claim 1 wherein said fixed wireless repeater further comprises:

means to connect said fixed wireless repeater to a wire-line telephone system.

* * * * *